United States Patent
Bomhoff et al.

(10) Patent No.: US 7,423,964 B2
(45) Date of Patent: Sep. 9, 2008

(54) APPARATUS AND METHOD TO SET THE SIGNALING RATE OF A NETWORK DISPOSED WITHIN AN INFORMATION STORAGE AND RETRIEVAL SYSTEM

(75) Inventors: Matthew D. Bomhoff, Tucson, AZ (US); Brian J. Cagno, Tucson, AZ (US); John C. Elliott, Tucson, AZ (US); Carl E. Jones, Tucson, AZ (US); Robert A. Kubo, Tucson, AZ (US); Gregg S. Lucas, Tucson, AZ (US); Katherine S. Tyldesley, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 604 days.

(21) Appl. No.: 10/993,768

(22) Filed: Nov. 18, 2004

(65) Prior Publication Data
US 2006/0104215 A1    May 18, 2006

(51) Int. Cl.
*G01R 31/08* (2006.01)
(52) U.S. Cl. .................. 370/229; 370/395.64; 370/465
(58) Field of Classification Search ........................ None
See application file for complete search history.

(56) References Cited

U.S. PATENT DOCUMENTS

| | | | |
|---|---|---|---|
| 3,731,152 A | * | 5/1973 | Rockefeller, Jr. ............. 361/80 |
| 4,476,535 A | * | 10/1984 | Loshing et al. ........ 340/870.13 |
| 4,830,449 A | | 5/1989 | Spillman et al. |
| 5,208,652 A | | 5/1993 | Sonobe et al. |
| 5,307,342 A | | 4/1994 | Georigiou et al. |
| 5,459,607 A | | 10/1995 | Fellows et al. |

(Continued)

FOREIGN PATENT DOCUMENTS

EP    1189477 A2    3/2002

OTHER PUBLICATIONS

IBM Technical Disclosure Bulletin, Dynamic Automatic Optical Baud Rate Selection, vol. 36, No. 05, May 1993, pp. 75-78.

(Continued)

*Primary Examiner*—Firmin Backer
*Assistant Examiner*—Phuongchau B Nguyen
(74) *Attorney, Agent, or Firm*—Dale F. Regelman; Quarles & Brady LLP (57) ABSTRACT

A method is disclosed to set the speed of a network. The method supplies a network interconnected with a system controller and a plurality of switch domains, where each of those plurality of switch domains comprises one or more information storage devices and a switch domain controller, and sets by each of the plurality of switch domains a signaling rate for that switch domain. The method queries in-band by the system controller each of the plurality of switch domains for that switch domain's signaling rate, and provides in-band by each of the plurality of switch domains the signaling rate for that switch domain. The method provides in-band by the system controller to each of the plurality of switch domains a first speed selection command specifying a first network speed, and resets by each of the plurality of switch domains the signaling rate for that switch domain to the first network speed.

11 Claims, 10 Drawing Sheets

U.S. PATENT DOCUMENTS

| | | | |
|---|---|---|---|
| 5,596,575 A * | 1/1997 | Yang et al. | 370/468 |
| 5,673,254 A * | 9/1997 | Crayford | 370/231 |
| 5,694,114 A | 12/1997 | Udd | |
| 5,953,340 A * | 9/1999 | Scott et al. | 370/401 |
| 6,025,944 A | 2/2000 | Mendez et al. | |
| 6,198,727 B1 * | 3/2001 | Wakeley et al. | 370/247 |
| 6,359,893 B1 * | 3/2002 | Mills | 370/465 |
| 6,442,174 B1 * | 8/2002 | Lin | 370/466 |
| 6,457,055 B1 * | 9/2002 | Hwong et al. | 370/242 |
| 6,486,633 B1 * | 11/2002 | Kronenberg | 318/700 |
| 6,510,265 B1 | 1/2003 | Giaretta et al. | |
| 6,529,957 B1 * | 3/2003 | Joergensen | 370/463 |
| 6,791,942 B2 * | 9/2004 | Jin | 370/229 |
| 6,907,008 B1 * | 6/2005 | Moskovich et al. | 370/241 |
| 2002/0012585 A1 * | 1/2002 | Kalkunte et al. | 370/389 |
| 2003/0053549 A1 * | 3/2003 | Uesugi | 375/261 |
| 2003/0212514 A1 * | 11/2003 | Koutlev et al. | 702/60 |
| 2005/0018650 A1 * | 1/2005 | Dropps et al. | 370/351 |
| 2005/0018671 A1 * | 1/2005 | Dropps et al. | 370/389 |
| 2005/0117511 A1 * | 6/2005 | Tsujimoto | 370/229 |

OTHER PUBLICATIONS

IBM Technical Disclosure Bulletin, "Serial String of Variable Speed Devices", vol. 39, No. 08, Aug. 1996, pp. 103-106.

IBM Technical Disclosure Bulletin, "Fiber-Optic Communications Loop", vol. 27, No. 1B, Jun. 1984, pp. 543-546.

Friday Morning, Nonlinear Multiplexing in Optical Fiber Communications, vol. 2 / OFC 2003.

* cited by examiner

APPARATUS AND METHOD TO SET THE SIGNALING RATE OF A NETWORK DISPOSED WITHIN AN INFORMATION STORAGE AND RETRIEVAL SYSTEM

FIELD OF THE INVENTION

This invention relates to an apparatus and method to set the signaling rate of a network disposed within an information storage and retrieval system.

BACKGROUND OF THE INVENTION

Data storage and retrieval systems are used to store information provided by one or more host computer systems. Such data storage and retrieval systems receive requests to write information to one or more data storage devices, and requests to retrieve information from those one or more data storage devices. Upon receipt of a write request, the system stores information received from a host computer in a data cache. In certain implementations, a copy of that information is also stored in a nonvolatile storage device. Upon receipt of a read request, the system recalls information from the one or more data storage devices and moves that information to the data cache. Thus, the system is continuously moving information to and from a plurality of data storage devices, and to and from the data cache.

In certain embodiments, a plurality of data storage devices are interconnected via a network, where that network comprises a plurality of individual switch domains each of which comprises one or more data storage devices. What is needed is a method to set the signaling rate for that network.

SUMMARY OF THE INVENTION

Applicants' invention comprises an apparatus and method to set the speed of a network. The method supplies a network interconnected with a system controller and a plurality of switch domains, where each of those plurality of switch domains comprises one or more information storage devices and a switch domain controller, and sets by each of the plurality of switch domains a signaling rate for that switch domain. The method queries in-band by the system controller each of the plurality of switch domains for that switch domain's signaling rate, and provides in-band by each of the plurality of switch domains the signaling rate for that switch domain. The method provides in-band by the system controller to each of the plurality of switch domains a first speed selection command specifying a first network speed, and resets by each of the plurality of switch domains the signaling rate for that switch domain to the first network speed.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

This invention is described in preferred embodiments in the following description with reference to the Figures, in which like numbers represent the same or similar elements. The invention will be described as embodied in an information storage and retrieval system which includes one or more system controllers and one or more Fibre Channel Arbitrated Loop networks interconnecting a plurality of switch domains with the one or more system processors. In certain embodiments, Applicants' information storage and retrieval system comprises two clusters, a plurality of host adapters, a plurality of device adapters, and a data cache. The following description of Applicant's method to initially and subsequently adjust the speed of a network is not meant, however, to limit Applicant's invention to data processing applications, as the invention herein can be applied to setting and adjusting network speeds in general.

Figure 1:
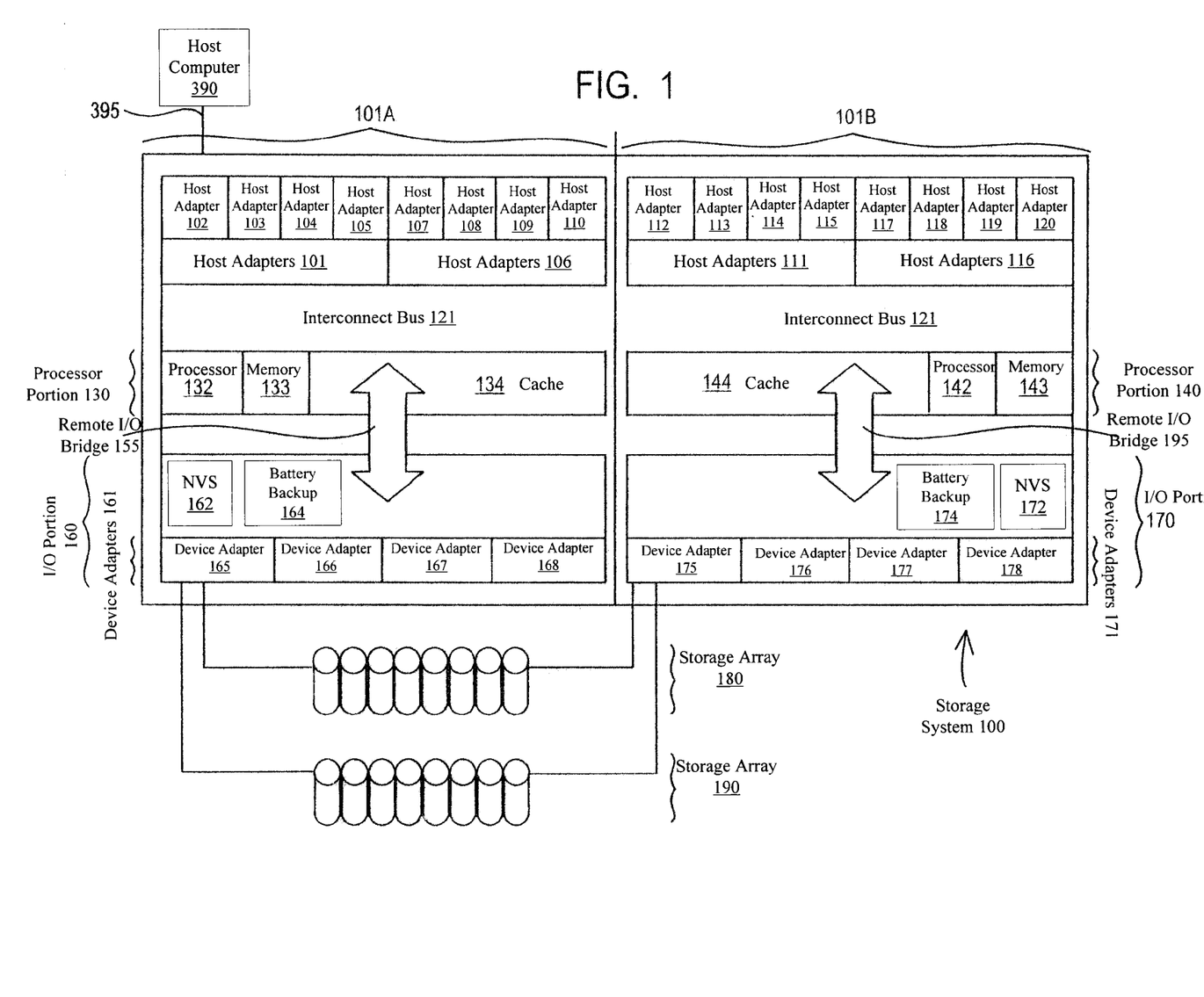
FIG. 1 is a block diagram showing one embodiment of Applicants' data storage and retrieval system.

Referring now to FIG. 1, information storage and retrieval system 100 is capable of communication with host computer 390 via communication link 395. The illustrated embodiment of FIG. 1 shows a single host computer. In other embodiments, Applicants' information storage and retrieval system is capable of communicating with a plurality of host computers.

Host computer 390 comprises a computer system, such as a mainframe, personal computer, workstation, and combinations thereof, including an operating system such as Windows, AIX, Unix, MVS, LINUX, etc. (Windows is a registered trademark of Microsoft Corporation; AIX is a registered trademark and MVS is a trademark of IBM Corporation; and UNIX is a registered trademark in the United States and other countries licensed exclusively through The Open Group.) In certain embodiments, host computer 390 further includes a storage management program. The storage management program in the host computer 390 may include the functionality of storage management type programs known in the art that manage the transfer of data to a data storage and retrieval system, such as the IBM DFSMS implemented in the IBM MVS operating system.

In certain embodiments, Applicants' information storage and retrieval system 100 includes a first plurality of host adapters 101A which includes adapters 102-105 and 107-110; and a second plurality of host adapters 101B which includes adapters 112-115 and 117-120. In other embodiments, Applicants' information storage and retrieval system includes fewer than 16 host adapters. In still other embodiments, Applicants' information storage and retrieval system includes more than 16 host adapters. Regardless of the number of host adapters disposed in any embodiments of Applicants' system, each of those host adapters comprises a shared resource that has equal access to both central processing/cache elements 130 and 140.

Each host adapter utilizes a host communication protocol such as a Fibre Channel, FICON, ESCON, SCSI, iSCSI, Infiniband, and the like. Each host adapter is connected to both clusters through interconnect bus 121 such that each cluster can handle I/O from any host adapter. Internal buses in each subsystem are connected via a Remote I/O bridge 155/195 between the processor portions 130/140 and I/O portions 160/170, respectively.

Processor portion 130 includes processor 132 and cache 134. In certain embodiments, processor portion 130 further includes memory 133. In certain embodiments, memory device 133 comprises random access memory. In certain embodiments, memory device 133 comprises non-volatile memory.

Processor portion 140 includes processor 142 and cache 144. In certain embodiments, processor portion 140 further includes memory 143. In certain embodiments, memory device 143 comprises random access memory. In certain embodiments, memory device 143 comprises non-volatile memory.

I/O portion 160 comprises a plurality of device adapters 161 which in the illustrated embodiment of FIG. 1 comprises device adapters 165, 166, 167, and 168. I/O portion 160 further comprise nonvolatile storage ("NVS") 162 and battery backup 164 for NVS 162.

I/O portion 170 comprises a plurality of device adapters 171 which in the illustrated embodiment of FIG. 1 comprises device adapters 175, 176, 177, and 178. I/O portion 170 further comprise nonvolatile storage ("NVS") 172 and battery backup 174 for NVS 172.

In certain embodiments of Applicants' system, one or more host adapters 101, processor portion 130, one or more device adapters 161, and a switch 207, are disposed in a controller, such as controller 205a (FIG. 3), disposed in Applicants' information storage and retrieval system. Similarly, in certain embodiments, one or more host adapters 111, processor portion 140, one or more device adapters 171, and a switch are disposed in a second controller, such as controller 205b (FIG. 3), disposed in Applicants' information storage and retrieval system. In these embodiments, Applicants' system 100 includes two controllers interconnected to a plurality of data storage devices.

In the illustrated embodiment of FIG. 1, sixteen data storage devices are organized into two arrays, namely array 180 and array 190. The illustrated embodiment of FIG. 1 shows two storage device arrays. Each storage array appears to a host computer as one or more logical devices.

In certain embodiments, one or more of the data storage devices comprise a plurality of hard disk drive units. In certain embodiments, arrays 180 and 190 utilize a RAID protocol. In certain embodiments, arrays 180 and 190 comprise what is sometimes called a JBOD array, i.e. "Just a Bunch Of Disks" where the array is not configured according to RAID. In certain embodiments, arrays 180 and 190 comprise what is sometimes called an SBOD array, i.e. "Switched Bunch Of Disks".

The illustrated embodiment of FIG. 1 shows two storage device arrays. In other embodiments, Applicants' system includes a single storage device array. In yet other embodiments, Applicants' system includes more than two storage device arrays.

Figure 2:
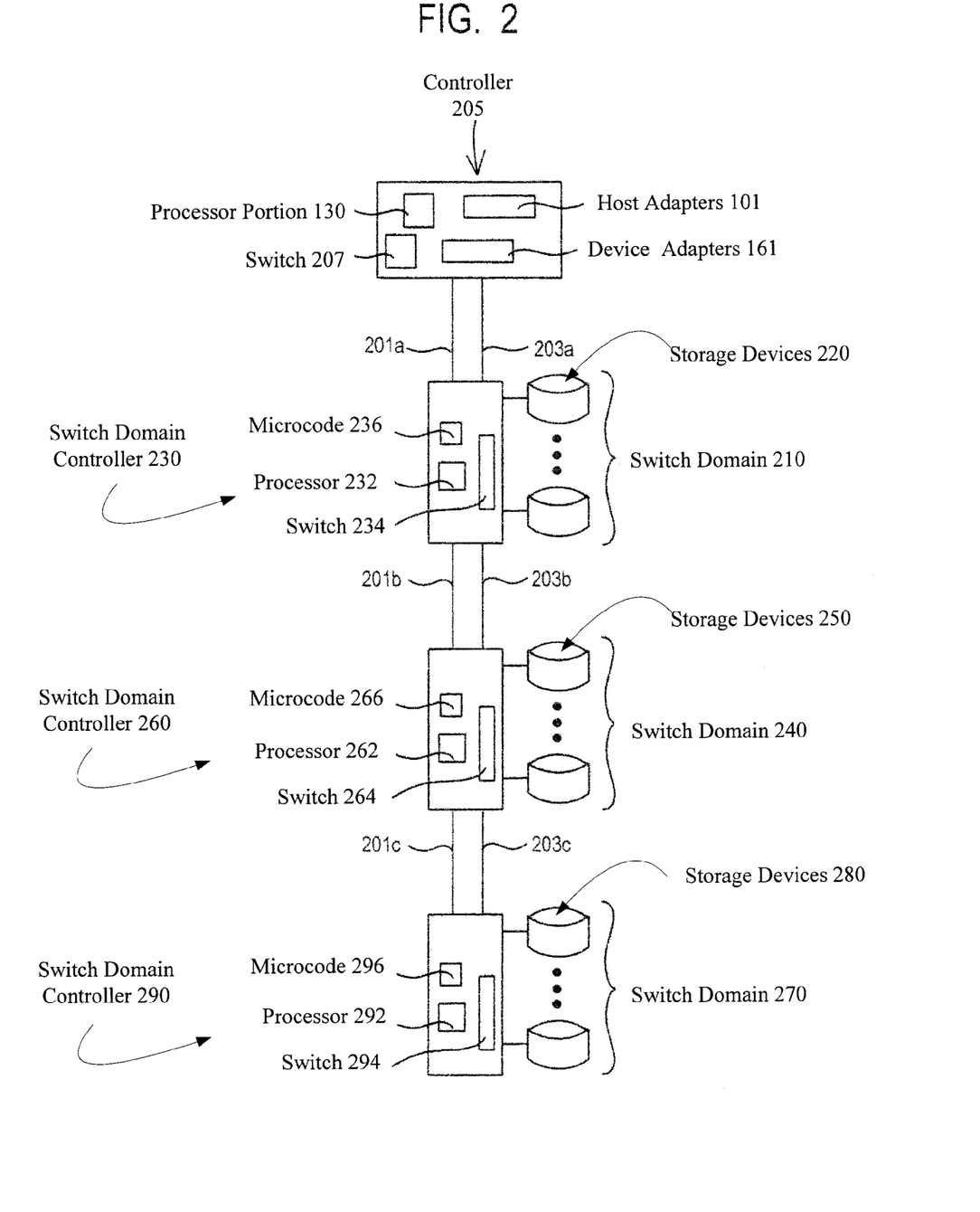
FIG. 2 is a block diagram showing a second embodiment of the data storage and retrieval system of FIG. 1 comprising three switch domains, each of which comprises one or more data storage devices.

Referring now to FIG. 2, a plurality of data storage devices 220, 250, and 280, are interconnected with system controller 205 using three switch domains interconnected by a communication loop comprising communication links 201a, 201b, 201c,203c, 203b, and 203a. In certain embodiments, the communication loop comprising communication links 201a, 201b, 201c, 203c, 203b, and 203a comprises a Fibre Channel Arbitrated Loop.

Those three switch domains include switch domain 210, switch domain 240, and switch domain 270. Each switch domain includes a switch domain controller comprising a switch and one or more data storage devices interconnected to that controller. Switch domain 210 comprises switch domain controller 230 and one or more data storage devices 220. Switch domain controller 230 comprises processor 232, switch 234, and microcode 236. In certain embodiments, switch 234 comprises a Fibre Channel switch.

Switch domain 240 comprises switch domain controller 260 and one or more data storage devices 250. Switch domain controller 260 comprises processor 262, switch 264, and microcode 266. In certain embodiments, switch 264 comprises a Fibre Channel switch.

Switch domain 270 comprises switch domain controller 290 and one or more data storage devices 280. Switch domain controller 290 comprises processor 292, switch 294, and microcode 296. In certain embodiments, switch 294 comprises a Fibre Channel switch.

The network loop structure shown in FIG. 2 comprises one embodiment of Applicant's system. In other embodiments, communication links 201a, 201b, 201c, 203c, 203b, and 203a comprise a switched fabric or a combination of a switch and loop topologies.

In yet other embodiments, Applicants' information storage and retrieval system comprises two system controllers interconnected with dual FC-AL loops of switches. In the illustrated embodiment of FIG. 3, system controllers 205a and 205b are connected to two FC-AL loops. Each loop contains one or more switch domain controllers, such as switch domain controllers 310, 320, 330, 340, 350, and 360.

Each switch domain controller comprises a switch, a processor, and microcode. In certain embodiments, the switch comprises a Fibre Channel switch. In certain embodiments, the processor comprises a SCSI enclosure services ("SES") processor which, as those skilled in the art will appreciate, provides power control, configuration control, environmental sense as well as other facilities. For example, switch domain controllers 310, 320, 330, 340, 350, and 360, include processors 312, 322, 332, 342, 352, and 362, respectively. Similarly, switch domain controllers 310, 320, 330, 340, 350, and 360, include switches 314, 324, 334, 344, 354, and 364, respectively. In addition, switch domain controllers 310, 320, 330, 340, 350, and 360, include microcode 316, 326, 336, 346, 356, and 366, respectively. The illustrated embodiment of FIG. 3 includes 6 switch domains.

Figure 3:
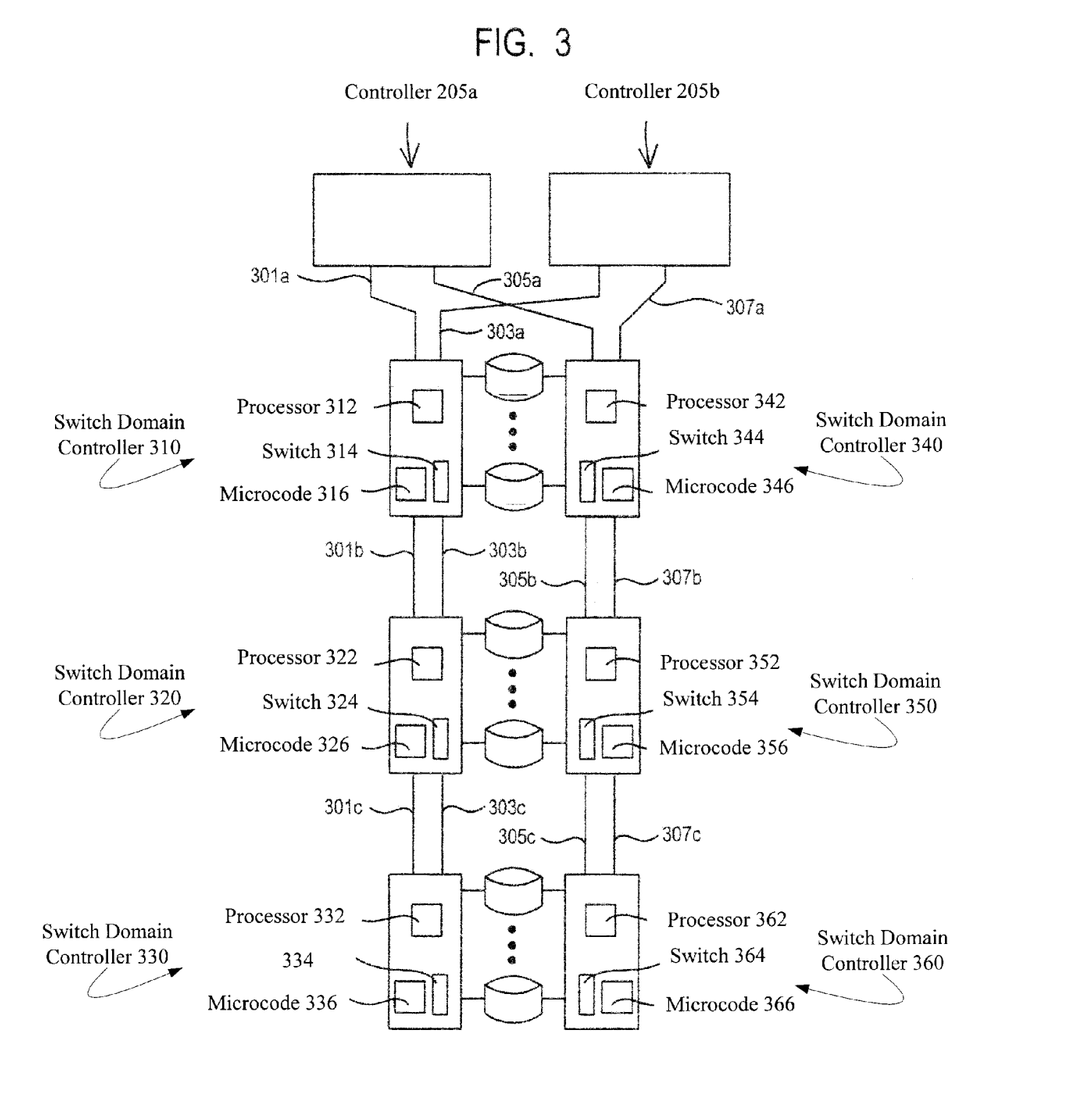
FIG. 3 is a block diagram showing a third embodiment of the data storage and retrieval system of FIG. 1 comprising six switch domains, each of which comprises one or more data storage devices.
Figure 4:
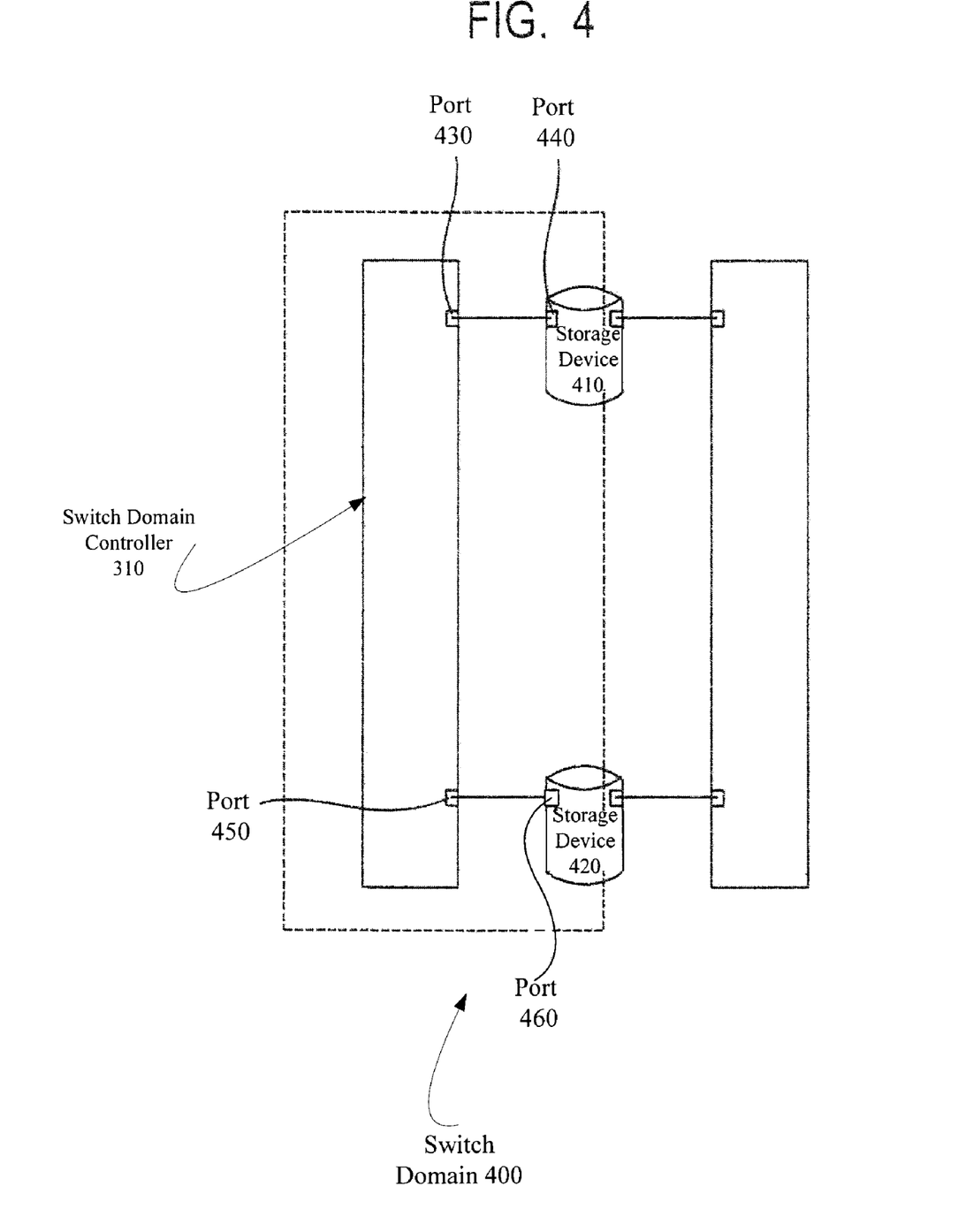
FIG. 4 is a block diagram showing a first switch domain in the data storage and retrieval system of FIG. 3.

Referring now to FIG. 4, switch domain 400 includes switch domain controller 310 (FIG. 3) and data storage devices 410 and 420. Data storage devices 410 and 420 each comprise two I/O ports. Port 440 of data storage device 410 is interconnected with port 430 of switch domain controller 310. Port 460 of data storage device 420 is interconnected with port 450 of switch domain controller 310.

Figure 5:
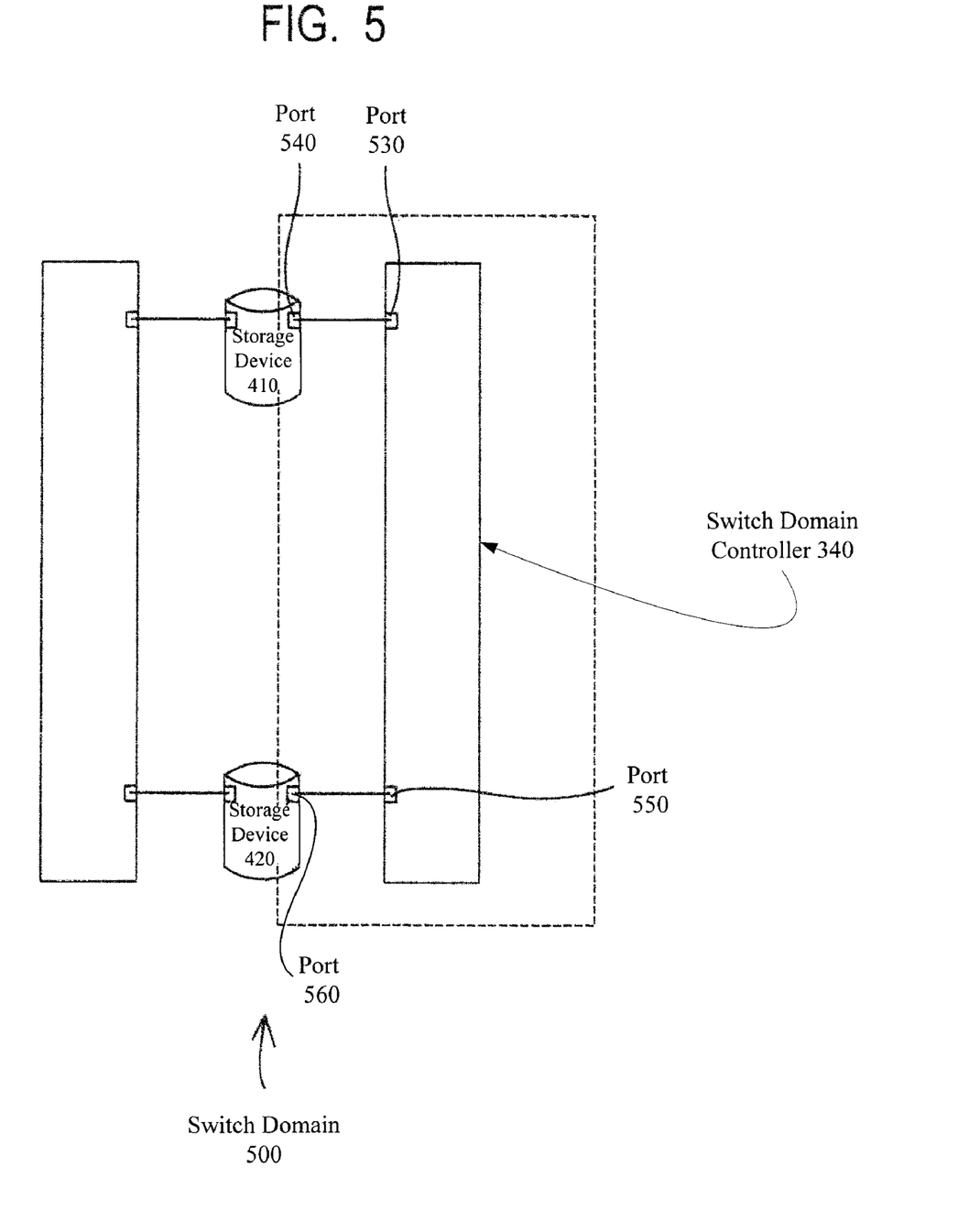
FIG. 5 is a block diagram showing a second switch domain in the data storage and retrieval system of FIG. 3.

Referring to FIG. 5, switch domain 500 includes switch domain controller 340 (FIG. 3) and data storage devices 410 and 420. Data storage devices 410 and 420 each comprise two I/O ports. Port 540 of data storage device 410 is interconnected with port 530 of switch domain controller 340. Port 560 of data storage device 420 is interconnected with port 550 of switch domain controller.

In certain embodiments of Applicants' method, each of the two ports disposed on a data storage device must operate at the same signaling rate. For example, switch domain 400 may be capable of operating at a speed of about 4 gigabits per second. Switch domain 500 may be limited to an operating speed of about 2 gigabits per second if, for example, port 540 can support a 2 gigabit per second speed but not a 4 gigabit per second speed, even if all of the other components comprising switch domain 500 are capable of operating at about 4 gigabits per second. If switch domain 400 keeps data storage device 410 on-line and operates at 2 gigabits per second, and if switch domain 500 keeps data storage device 410 on-line, then both switch domains operate at a 2 gigabits per second signaling rate. Alternatively, if switch domain 500 takes data storage device 410 off-line, then both switch domains can operate at a 4 gigabit per second signaling rate.

Figure 8:
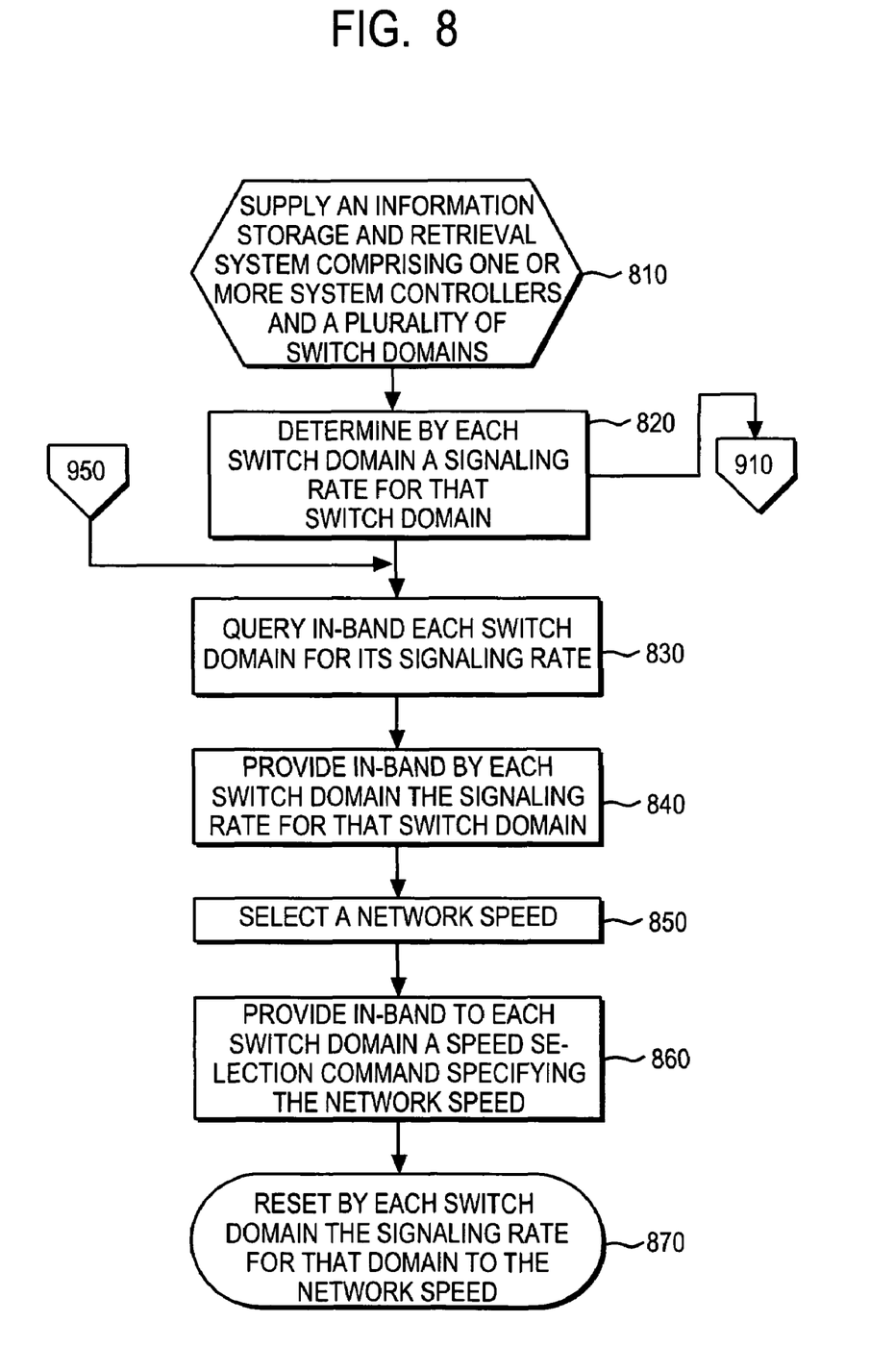
FIG. 8 is a flow chart summarizing certain steps of Applicants' method.

Applicants' invention includes a method to set a network speed for a network disposed within Applicants' information storage and retrieval system. Referring now to FIG. 8, in step 810 Applicants' method provides an information storage and retrieval system that comprises one or more system controllers, such as system controller 205 (FIG. 2). For example, FIG. 2 shows an embodiment of Applicants' system that comprises one system controller. FIG. 3 shows an embodiment of Applicants' system comprising two system controllers.

Step 810 further comprises supplying one or more switch domains, such as switch domain 210 (FIG. 2), in communication with the one or more system controllers via one or more networks, such as the network comprising communication links 201a (FIG. 2), 201b (FIG. 2), 201c (FIG. 2), 203a (FIG. 2), 203b (FIG. 2), and 203c (FIG. 2).

In step 820, each switch domain sets a signaling rate for that switch domain. For example in the illustrated embodiment of FIG. 2, in step 820 switch domains 210 (FIG. 2), 240 (FIG. 2), and 270 (FIG. 2), each independently sets a switch domain signaling rate. In certain embodiments, step 820 includes the steps recited in FIG. 9.

Figure 9:
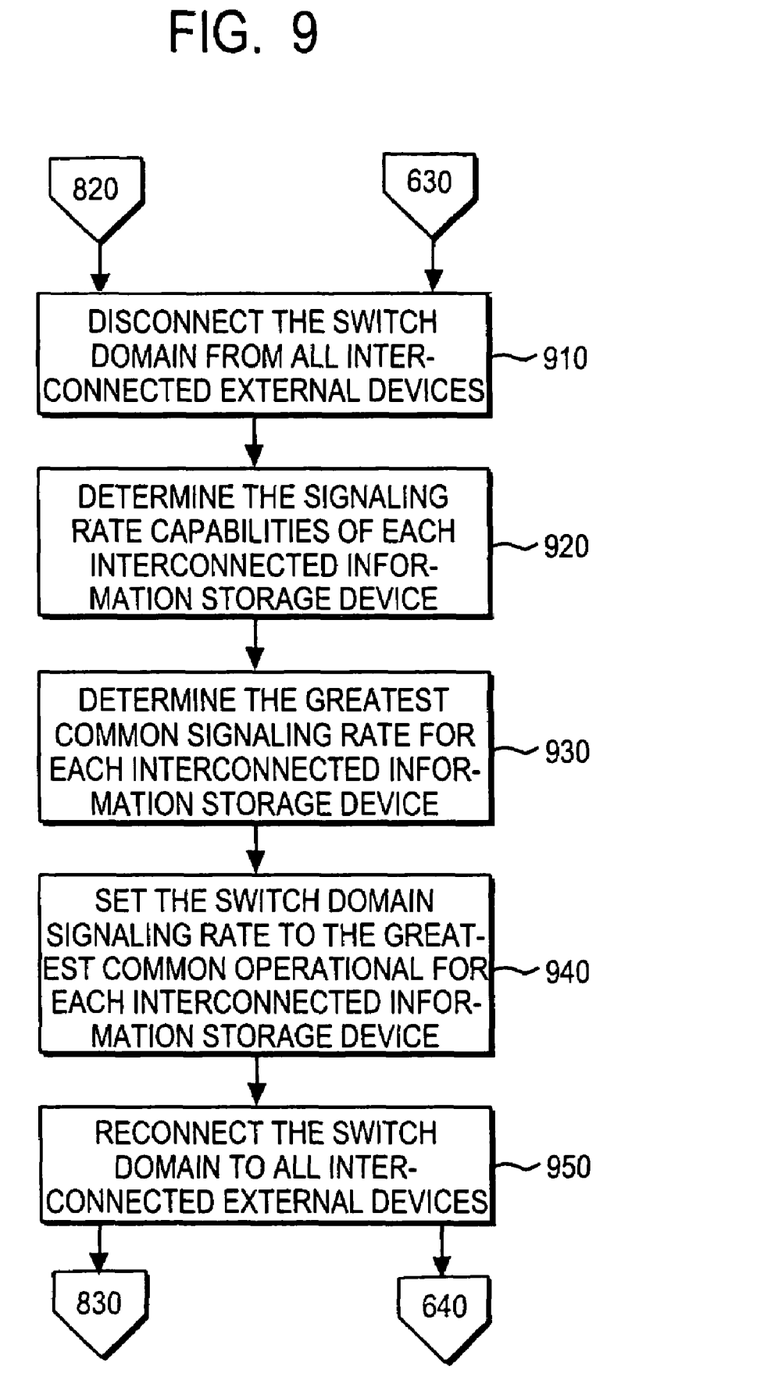
FIG. 9 is a flow chart summarizing certain steps in Applicants' method.

Referring now to FIG. 9, in step 910 each switch domain, such as switch domains 210 (FIG. 2), 240 (FIG. 2), and 270 (FIG. 2), disconnects from the network leaving only the information storage devices disposed in that switch domain interconnected with the switch disposed in that switch domain. In certain embodiments, step 910 is performed by a processor, such as processor 232 (FIG. 2), disposed in each switch domain, such as switch domain 210. For example, processor 232 in step 820 disables communication links 201a, 201b, 203a, and 203b.

Applicants' method transitions from step 910 to step 920 wherein each switch domain, such as switch domains 210 (FIG. 2), 240 (FIG. 2), and 270 (FIG. 2), determines the signaling rate capabilities of each information storage device and the switch disposed in that switch domain. In certain embodiments, step 920 is performed by a processor, such as processor 232, disposed in each switch domain, such as switch domain 210.

A pending patent application (the "Incorporated Disclosure") entitled "Apparatus and Method to Set The Signaling Rate Of A Switch Domain Disposed In An Information Storage and Retrieval System," and assigned to the common assignee hereof, is hereby incorporated herein by reference. In certain embodiments, Applicants' apparatus comprises the apparatus described in the Specification of the Incorporated Disclosure and shown in FIGS. 5A, 5B, 5C, 6A, 6B, 7A, 7B, 7C, in the Incorporated Disclosure. In certain embodiments, Applicants' method comprises the steps recited in FIGS. 8, 9, 10, and 11, of the Incorporated Disclosure. In certain embodiments, step 920 of this Application comprises the steps shown in FIGS. 8, 9, and 10, of the Incorporated Disclosure.

In step 930, each switch domain, such as switch domains 210 (FIG. 2), 240 (FIG. 2), and 270 (FIG. 2), determines the greatest common signaling rate for the interconnected information storage devices and switch comprising the switch domain. In certain embodiments, step 930 is performed by a processor, such as processor 232, disposed in each switch domain, such as switch domain 210.

In step 940, each switch domain, such as switch domains 210 (FIG. 2), 240 (FIG. 2), and 270 (FIG. 2), sets the greatest common signaling rate for its interconnected information storage devices as the switch domain signaling rate. In certain embodiments, step 940 is performed by a processor, such as processor 232, disposed in each switch domain, such as switch domain 210.

In step 950, each switch domain, such as switch domains 210 (FIG. 2), 240 (FIG. 2), and 270 (FIG. 2), reconnects the switch portion and the processor portion of the switch domain to all interconnected external devices, i.e. reconnects the switch portion and the processor portion to the network. In certain embodiments, step 950 is performed by a processor, such as processor 232, disposed in each switch domain, such as switch domain 210.

Referring again to FIG. 8, in step 830 Applicants' method queries in-band each switch domain to ascertain that switch domain's signaling rate. In certain embodiments, step 830 is performed by a system controller, such as controller 205 (FIG. 2). By "in-band communication," Applicants mean communicating using the same network used to transmit data files to and from the information storage devices comprising the one or more interconnected switch domains, such as for example the network comprising communication links 201a, 201b, 201c, 203a, 203b, and 203c.

In step 840, in response to the query of step 830 each switch domain, such as switch domains 210 (FIG. 2), 240 (FIG. 2), and 270 (FIG. 2), provides in-band its switch domain signaling rate. In certain embodiments, step 840 is performed by a processor, such as processor 232, disposed in each switch domain, such as switch domain 210.

In step 850, Applicants' method selects a network speed. In certain embodiments, step 850 is performed by a system controller, such as controller 205 (FIG. 2).

In step 860, Applicants' method provides in-band to each interconnected switch domain a speed selection command specifying the network speed. In certain embodiments, step 860 is performed by a system controller, such as controller 205 (FIG. 2).

In step 870, each interconnected switch domain, such as switch domains 210 (FIG. 2), 240 (FIG. 2), and 270 (FIG. 2), sets that switch domain's signaling rate to the network speed. In certain embodiments, step 870 further comprises reconnecting to the network the information storage devices disposed in each switch domain. In certain embodiments, step 870 is performed by a processor, such as processor 232, disposed in each switch domain, such as switch domain 210.

Figure 10:
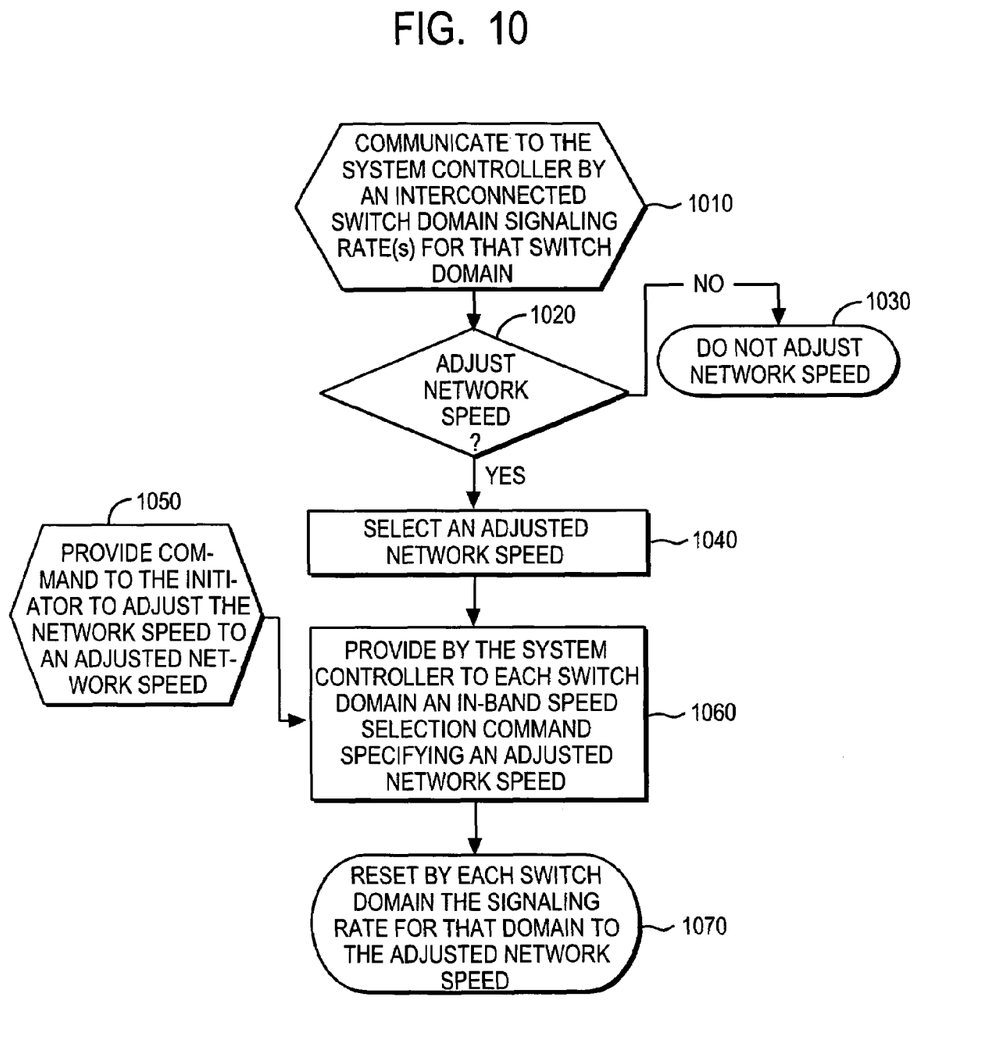
FIG. 10 is a flow chart summarizing certain steps in Applicants' method.

After a network speed has been set using the steps of FIG. 8, and optionally the steps of FIG. 9 of this Application and optionally the steps of FIGS. 8, 9, and 10, of the Incorporated Disclosure, the system controller may adjust the network speed. Referring now to FIG. 10, in step 1010 an interconnected switch domain, communicating in-band, provides alternative signaling rates for that switch domain.

For example, a switch domain, such as switch domain 500 (FIG. 5), comprising (N) interconnected information storage devices may have set its signaling rate to the first communication speed because one of the information storage devices, such as port 540 of information storage device 410, is not capable of operating at the second communication speed. The remaining (N−1) information storage device may be second communication speed capable. This switch domain in step 1010 provides a message to the one or more system controllers to the effect that (N−1) of its interconnected information storage devices are second communication speed capable. In certain embodiments, step 1010 is performed by a processor, such as processor 232, disposed in a switch domain, such as switch domain 210.

In step 1020, Applicants' method determines whether to adjust the network speed. In certain embodiments, step 1020 is performed by a system controller, such as controller 205 (FIGS. 2, 3). In certain embodiments, step 1020 is performed by a network operator. In certain embodiments, step 1020 is performed by a host computer.

If Applicants' method elects not to adjust the network speed, the method transitions to step 1030 wherein the network speed is left unchanged. Alternatively, if the method elects to adjust the network speed in step 1020, then the method transitions from step 1020 to step 1040 wherein the method selects an adjusted network speed. In certain embodiments, step 1020 is performed by a system controller, such as controller 205 (FIGS. 2, 3). In certain embodiments, step 1020 is performed by a network operator. In certain embodiments, step 1020 is performed by a host computer.

In step 1060, Applicants' method provides in-band a speed selection signal to each interconnected switch domain specifying the adjusted network speed. In certain embodiments, step 1020 is performed by a system controller, such as controller 205 (FIGS. 2, 3).

In step 1070, each switch domain sets its switch domain signaling rate to the adjusted network speed. In certain embodiments, step 1070 is performed by a processor, such as processor 232, disposed in each switch domain, such as switch domain 210.

Figure 6:
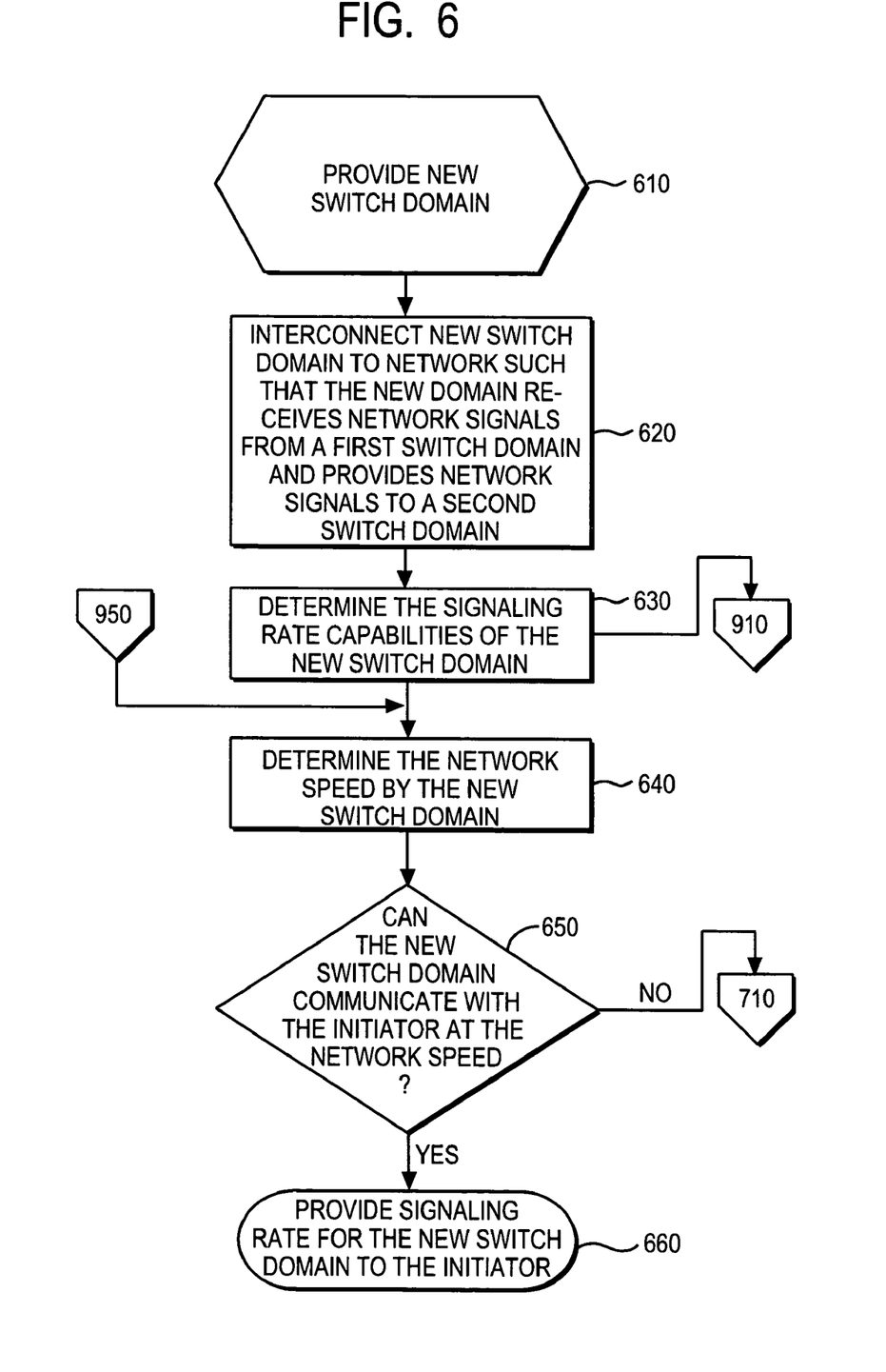
FIG. 6 is a flow chart summarizing certain steps in Applicants' method.

After a network speed has been set, and the network is operating at that network speed, a new switch domain may be added to the system. Applicants' method includes embodiments to add such a new switch domain without disrupting the operation of the network. Referring now to FIG. 6, in step 610 Applicants' method provides a new switch domain, such as for example switch domain 240 (FIG. 2). In step 620, Applicants' method interconnects that new switch domain to the network such that the new switch domain receives network signals from a first switch domain, such as switch domain 210 (FIG. 2), and provides network signals to a second switch domain, such as switch domain 270 (FIG. 2).

In step 630, the new switch domain sets its signaling rate. In certain embodiments, step 630 includes the steps recited in FIG. 9 of this Application, and optionally the steps of FIGS. 8, 9, and 10, of the Incorporated Disclosure. In certain embodiments, step 630 is performed by a processor, such as processor 262, disposed in the new switch domain, such as switch domain 240.

In step 640, the new switch domain determines the network speed by first attempting to communicate with the system controller using the slowest available signaling rate, and if unsuccessful, attempts to communicate at the next faster available signaling rate until reaching the fastest available signaling rate. In certain embodiments, step 640 is performed by a processor, such as processor 262, disposed in the new switch domain, such as switch domain 240.

In step 650, Applicants' method determines if the new switch domain is capable of communicating with the system controller at the network speed. In certain embodiments, step 650 is performed by a processor, such as processor 262, disposed in the new switch domain, such as switch domain 240.

If the new switch is capable of communicating with the system controller, then Applicants' method transitions from step 650 to step 660 wherein the new switch domain communicates, at the network speed, its switch domain signaling rate to the system controller.

If the new switch domain cannot communicate with the system controller at the network speed, then the method transitions from step 650 to step 710 (FIG. 7) wherein the new switch domain attempts to communicate with the system controller at a default signaling rate. In certain embodiments, Applicants' method includes setting a default signaling rate, such as for example 2 gigabits per second. In certain embodiments, step 710 is performed by a processor, such as processor 262, disposed in the new switch domain, such as switch domain 240.

Figure 7:
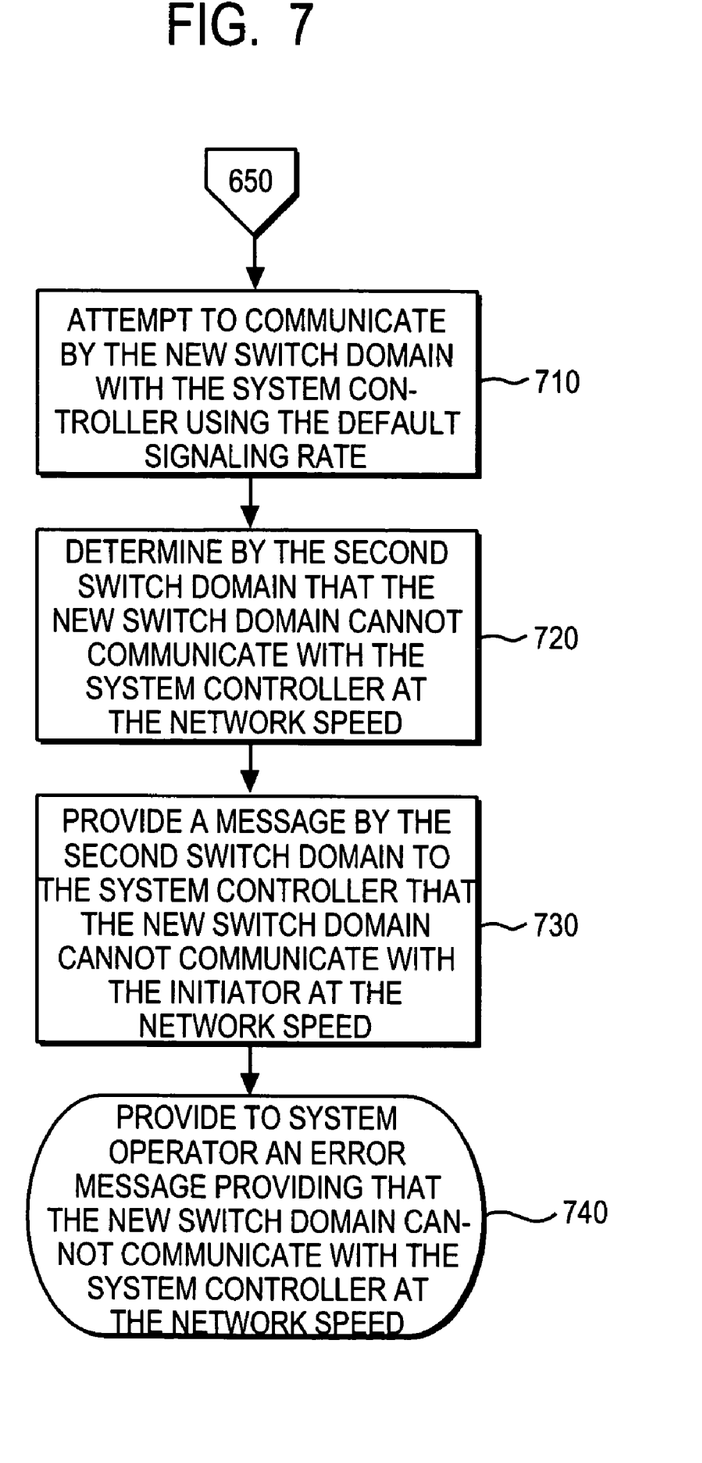
FIG. 7 is a flow chart summarizing certain steps in Applicants' method.

Referring now to FIG. 7, in step 720 Applicants' method determines that the new switch domain cannot communicate in-band with the system controller at the default signaling rate. In certain embodiments, step 720 is performed by the second switch domain, wherein that second switch domain will determine that the new switch domain is attempting to communicate in-band with the system controller at the default signaling rate but the system controller is not responding. In certain embodiments, step 720 is performed by a processor, such as processor 292, disposed in the second switch domain, such as switch domain 270.

If the second switch domain determines in step 720 that the new switch domain cannot communicate with the system controller, then in step 730 that second switch domain provides a message to the system controller that the new switch domain cannot communicate with the system controller at the network speed or the default signaling rate. In certain embodiments, step 730 is performed by a processor, such as processor 292, disposed in the 740, Applicants' method provides an error message to the system operator indicating that the new switch domain cannot communicate with the system controller. In certain embodiments, step 740 is performed by a system controller, such as controller 205 (FIGS. 2, 3). In certain embodiments, step 740 is performed by a host computer.

In response to the error message of step 740, the system operator may elect to adjust the network speed to accommodate the new switch domain. Referring now to FIG. 10, in certain embodiments the system operator in step 1050 provides a command to the system controller to set the network speed to an adjusted network speed. In certain embodiments, step 1050 includes using an operator input station. Applicants' method transitions from step 1050 to step 1060 and continues as described herein.

The embodiments of Applicants' method recited in FIGS. 6, 7, 8, 9, and 10, may be implemented separately. Moreover, in certain embodiments, individual steps recited in FIGS. 6, 7, 8, 9, and 10, may be combined, eliminated, or reordered.

In certain embodiments, Applicants' invention includes instructions residing in microcode, such as for example microcode 207 (FIG. 2), 236 (FIG. 2), 266 (FIG. 2), 296 (FIG. 2), 316 (FIG. 3), 326 (FIG. 3), 336 (FIG. 3), 346 (FIG. 3), 356 (FIG. 3), and/or 366 (FIG. 3), where those instructions are executed by a system processor, such controller 205 (FIG. 2) and/or a switch domain controller, such as controller 230 (FIG. 2), 260 (FIG. 2), 290 (FIG. 2), 310 (FIG. 3), 320 (FIG. 3), 330 (FIG. 3), 340 (FIG. 3), 350 (FIG. 3), and/or 360 (FIG. 3), to perform steps 630, 640, 650, and 660, recited in FIG. 6, and/or steps 710, 720, 730, and/or 740, recited in FIG. 7, and/or steps 820, 830, 840, 850, 860, and/or 870, recited in FIG. 8, and/or steps 910, 920, 930, 940, and/or 950, recited in FIG. 9, and/or steps 1010, 1020, 1030, 1040, 1060, and/or 1070, recited in FIG. 10.

In other embodiments, Applicants' invention includes instructions residing in any other computer program product, where those instructions are executed by a computer external to, or internal to, system 100, to perform steps 630, 640, 650, and 660, recited in FIG. 6, and/or steps 710, 720, 730, and/or 740, recited in FIG. 7, and/or steps 820, 830, 840, 850, 860, and/or 870, recited in FIG. 8, and/or steps 910, 920, 930, 940, and/or 950, recited in FIG. 9, and/or steps 1010, 1020, 1030, 1040, 1060, and/or 1070, recited in FIG. 10. In either case, the instructions may be encoded in an information storage medium comprising, for example, a magnetic information storage medium, an optical information storage medium, an electronic information storage medium, and the like. By "electronic storage media," Applicants mean, for example, a device such as a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to set the speed of a network, comprising the steps of:
   supplying a network interconnected with a system controller and a plurality of switch domains, wherein each of said plurality of switch domains comprises one or more information storage devices and a switch domain controller;
   setting by each of said plurality of switch domains a signaling rate for that switch domain;
   querying in-band by said system controller each of said plurality of switch domains for that switch domain's signaling rate;
   disconnecting by the switch domain processor disposed in each switch domain that switch domain from the network;
   determining by the switch domain processor disposed in each switch domain a signaling rate for that switch domain;
   reconnecting by the switch domain processor disposed in each switch domain that switch domain to the network;
   providing in-band by each of said plurality of switch domains the signaling rate for that switch domain;
   providing in-band by said system controller to each of said plurality of switch domains a first speed selection command specifying a first network speed;
   resetting by each of said plurality of switch domains the signaling rate for that switch domain to said first network speed.

2. The method of claim 1, wherein said resetting step further comprises the steps of:
   disconnecting by the switch domain processor disposed in each switch domain that switch domain from the network;
   setting by the switch domain processor disposed in each switch domain the signaling rate for that switch domain to the first network speed;
   reconnecting by the switch domain processor disposed in each switch domain that switch domain to the network.

3. The method of claim 1, further comprising the steps of:
   communicating to said system controller by a first switch domain one or more signaling rates for that first switch domain;
   determining by said system controller whether to adjust said network speed;
   operative if said system controller elects to adjust said network speed;
   providing in-band by said system controller to each of said plurality of switch domains a second speed selection command specifying a second network speed;
   resetting by each of said plurality of switch domains and said new switch domain the signaling rate for that switch domain to said second network speed.

4. The method of claim 3, wherein said resetting by each of said plurality of switch domains and said new switch domain the signaling rate for that switch domain to said second network speed step further comprises the steps of:
   disconnecting by the switch domain processor disposed in each switch domain that switch domain from the network;
   setting by the switch domain processor disposed in each switch domain the signaling rate for that switch domain to the second network speed;
   reconnecting by the switch domain processor disposed in each switch domain that switch domain to the network.

5. A method to set the speed of a network, comprising the steps of:
   supplying a network interconnected with a system controller and a plurality of switch domains, wherein each of said plurality of switch domains comprises one or more information storage devices and a switch domain controller;
   setting by each of said plurality of switch domains a signaling rate for that switch
   querying in-band by said system controller each of said plurality of switch domains for that switch domain's signaling rate;
   providing in-band by each of said plurality of switch domains the signaling rate for that switch domain;
   providing in-band by said system controller to each of said plurality of switch domains a first speed selection command specifying a first network speed;
   resetting by each of said plurality of switch domains the signaling rate for that switch domain to said first network speed;
   providing a new switch domain comprising a switch domain processor and one or more information storage devices;
   interconnecting said new switch domain to said network;
   ascertaining by the switch domain processor disposed in said new switch domain the signaling rate for that new switch domain;
   determining by the switch domain processor disposed in said new switch domain said first network speed;
   attempting to communicate in-band to said system controller by the switch domain processor disposed in said new switch domain at said first network speed;
   operative if the switch domain processor disposed in said new switch domain is capable of communicating in band with said system controller at said first network speed, providing in-band to said system controller the signaling rate for said new switch domain.

6. The method of claim 5, wherein said ascertaining step further comprises the steps of:
- disconnecting by the switch domain processor disposed in said new switch domain that new switch domain from the network;
- determining by the switch domain processor disposed in said new switch domain the signaling rate of that new switch domain;
- reconnecting by the switch domain processor disposed in said new switch domain that new switch domain to said network.

7. The method of claim 5, further comprising the steps of:
- providing in-band by said system controller to each of said plurality of switch domains a second speed selection command specifying a second network speed;
- resetting by each of said plurality of switch domains and said new switch domain the signaling rate for that switch domain to said second first network speed.

8. The method of claim 5, wherein said network comprises a Fibre Channel Arbitrated Loop and wherein said new switch domain receives network signals from a first switch domain and provides network signals to a second switch domain, further comprising the steps of:
- determining by the switch domain processor disposed in said second switch domain that said new switch domain cannot communicate at said first network speed;
- alerting said system controller by the switch domain processor disposed in said second switch domain that said new switch domain cannot communicate at said first network speed.

9. The method of claim 8, wherein said network is disposed in an information storage and retrieval system operated by a system operator, further comprising the step of providing by said system controller an error message to said system operator.

10. The method of claim 9, further comprising the steps of:
- electing by said system operator to adjust said network speed;
- providing by said operator to said system controller a command to adjust said network speed;
- providing in-band by said system controller to each of said plurality of switch domains a second speed selection command specifying a second network speed;
- resetting by each of said plurality of switch domains and said new switch domain the signaling rate for that switch domain to said second network speed.

11. The method of claim 10, wherein said resetting by each of said plurality of switch domains and said new switch domain the signaling rate for that switch domain to said second network speed step further comprises the steps of:
- disconnecting by the switch domain processor disposed in each switch domain that switch domain from the network;
- setting by the switch domain processor disposed in each switch domain the signaling rate for that switch domain to the second network speed;
- reconnecting by the switch domain processor disposed in each switch domain that switch domain to the network.

* * * * *